United States Patent
Takahashi et al.

(10) Patent No.: US 9,410,512 B2
(45) Date of Patent: Aug. 9, 2016

(54) AIR INTAKE APPARATUS FOR FOUR WHEELED UTILITY VEHICLE

(71) Applicant: KAWASAKI JUKOGYO KABUSHIKI KAISHA, Hyogo (JP)

(72) Inventors: Keiji Takahashi, Akashi (JP); Yoko Yasui, Kobe (JP); Yuji Kouma, Takasago (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/836,800

(22) Filed: Mar. 15, 2013

(65) Prior Publication Data

US 2014/0261275 A1    Sep. 18, 2014

(51) Int. Cl.
*B60K 11/06* (2006.01)
*B60K 13/02* (2006.01)
*F02M 35/16* (2006.01)

(52) U.S. Cl.
CPC .............. *F02M 35/164* (2013.01); *B60K 11/06* (2013.01); *B60K 13/02* (2013.01); *F02M 35/161* (2013.01)

(58) Field of Classification Search
USPC ........................ 180/68.1, 68.2, 68.3, 291, 292
See application file for complete search history.

(56) References Cited

U.S. PATENT DOCUMENTS

| 5,195,484 | A * | 3/1993 | Knapp ...................... 123/198 E |
| 5,327,989 | A * | 7/1994 | Furuhashi et al. ............ 180/248 |
| 7,059,438 | B1 * | 6/2006 | Sheets .......................... 180/68.1 |
| 7,168,516 | B2 * | 1/2007 | Nozaki et al. ................ 180/68.3 |
| 8,316,975 | B2 | 11/2012 | Azuma |
| 2006/0270503 | A1 * | 11/2006 | Suzuki et al. ................. 474/144 |
| 2010/0155170 | A1 * | 6/2010 | Melvin et al. ................ 180/339 |
| 2011/0094811 | A1 * | 4/2011 | Suzuki et al. ................ 180/68.4 |
| 2011/0132678 | A1 * | 6/2011 | Nakamura et al. ........... 180/68.3 |
| 2011/0259694 | A1 * | 10/2011 | Matsumura ..................... 191/10 |

FOREIGN PATENT DOCUMENTS

JP    2010-151237    7/2010

* cited by examiner

*Primary Examiner* — Frank Vanaman
(74) *Attorney, Agent, or Firm* — Wenderoth, Lind & Ponack, L.L.P.

(57) ABSTRACT

An air intake apparatus is provided for a utility vehicle having a front seat, a rear seat, a cargo bed, an engine arranged below the rear seat and/or the cargo bed, and a V-belt type continuously variable transmission arranged sideward of the engine. The apparatus includes an air cleaner connected to an air intake portion of the engine via a intake manifold, a cooling duct connected to an air intake portion for cooling the V-belt type continuously variable transmission, and a space in which front, rear, right, left, and lower sides thereof are surrounded by surrounding members arranged below the front seat or the rear seat. The air cleaner, an air intake opening thereof, and an air intake opening at an end of the cooling duct are arranged in the space.

8 Claims, 7 Drawing Sheets

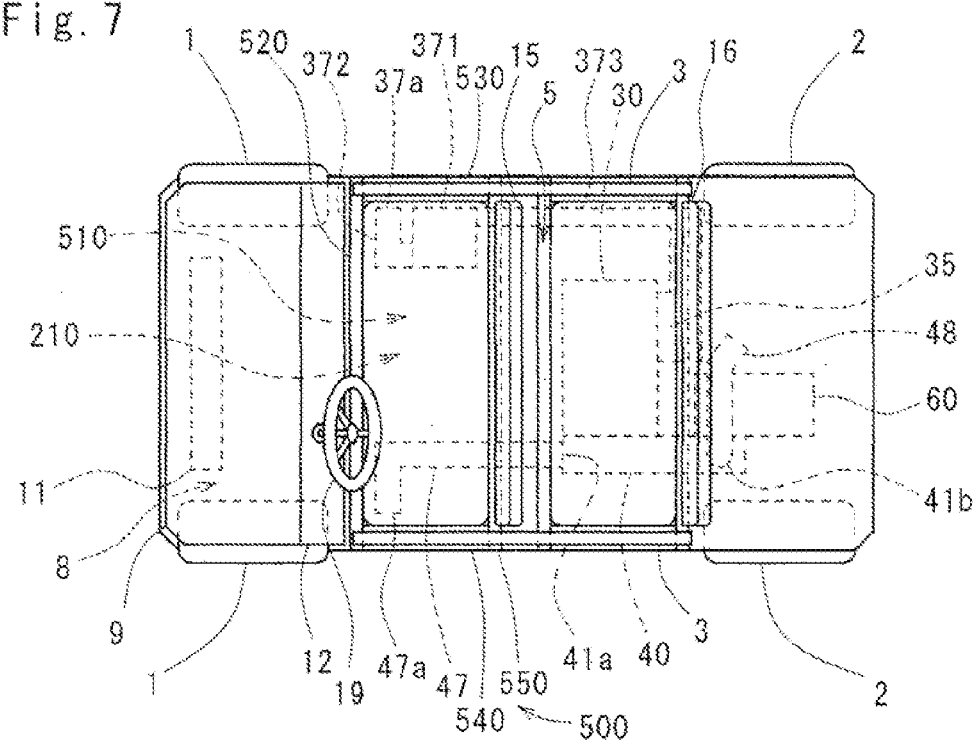
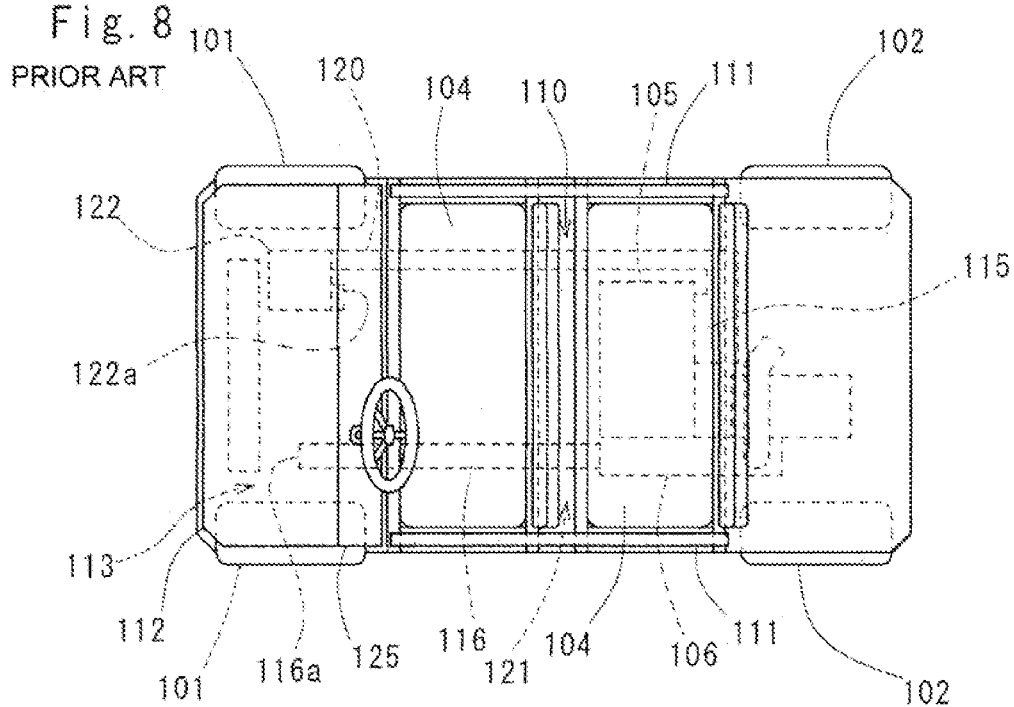

AIR INTAKE APPARATUS FOR FOUR WHEELED UTILITY VEHICLE

BACKGROUND OF INVENTION

1. Field of the Invention

The present invention relates to an air intake apparatus for four wheeled vehicle. More specifically, the present invention relates to an air intake apparatus mainly for a utility vehicle suitable for driving on an irregular ground for supplying combustion air into an engine and an air intake apparatus for supplying air for cooling a V-belt type continuously variable transmission.

2. Description of the Prior Art

FIG. 8 shows an example of a conventional utility vehicle. The vehicle includes a riding space 110 surrounded by a ROPS 111 between a pair of right and left front wheels 101 and a pair of right and left rear wheels 102. Seats 104 are provided in the riding space 110. An engine 105 and a V-belt type continuously variable transmission 106 are arranged below the seat 104. A hood 112 is provided in front of the riding space 110, and covers the upper side of a hood chamber 113.

An air intake apparatus for supplying combustion air into the engine 105 includes an intake manifold 115 arranged sideward of the engine 105, a first air intake duct 120 connected to the intake manifold 115, and an air cleaner 122 connected to the air intake duct 120. The air intake duct 120 is extended downward from the intake manifold 115 to a floor surface 121 in the riding space 110, is extended forward along the floor surface 121, and is raised in the hood chamber 113. The air cleaner 122 is provided at the upper end of the air intake duct 120. An air intake opening 122a of the air cleaner 122 is opened into a dashboard 125 adjacent to the rear side of the hood chamber 113. As a prior art document, there is U.S. Pat. No. 8,316,975B2.

In addition, an air intake apparatus for supplying air for cooling the V-belt type continuously variable transmission 106 includes a second air intake duct 116 connected to the front portion of the V-belt type continuously variable transmission 106. The air intake duct 116 is extended forward from the front portion of the V-belt type continuously variable transmission 106 along the floor surface 121 in the riding space 110. An air intake opening 116a at the end of the air intake duct 116 is opened into the hood chamber 113. As a prior art document, there is Japanese Unexamined Patent Publication No. 2010-151237.

When the utility vehicle is driven on irregular ground, dirt, sand, water, or other foreign substances kicked up by the front wheels 101 may enter into the air intake apparatus for engine or the V-belt type continuously variable transmission. To prevent this, the air intake openings 116a and 122a of these air intake apparatuses are arranged in the hood chamber 113 in which the upper side thereof is covered by the hood 112. The air intake openings 116a and 122a are opened into a space into which dirt, sand, water, or other foreign substances kicked up by the front wheels 101 is hard to enter.

The air intake ducts 120 and 116 are extended forward from the engine 105 and the V-belt type continuously variable transmission 106 arranged below the seat 104 along the floor surface 121 in the riding space 110, so that the ends thereof are arranged in the hood chamber 113. The air intake path from the air intake opening 122a of the air intake apparatus for engine to the intake manifold 115 of the engine 105 is long, and the air intake path from the air intake opening 116a of the duct 116 for cooling the V-belt type continuously variable transmission to the air intake portion of the V-belt type continuously variable transmission 106 is long. Consequently, the airflow resistance in the air intake ducts 120 and 116 is increased. In addition, the air intake ducts 120 and 116 are of a divided type in consideration of assembling ability, resulting in increasing the number of components.

SUMMARY OF THE INVENTION

The present invention has been made in view of the above problems, and an object of the present invention is to improve performance of an engine and a cooling ability of a V-belt type continuously variable transmission by using a simple configuration to shorten air intake paths from air intake openings to air intake portions for reducing airflow resistance while preventing dirt, sand, water, or other foreign substances kicked up by front wheels and/or rear wheels from entering into an air cleaner and the V-belt type continuously variable transmission.

To achieve the above object, the present invention provides an air intake apparatus for a utility vehicle having a front seat, a rear seat, a cargo bed, an engine arranged below the rear seat and/or the cargo bed, and a V-belt type continuously variable transmission arranged sideward of the engine. The apparatus includes an air cleaner connected to an air intake portion of the engine via an intake manifold, a cooling duct connected to an air intake portion for cooling the V-belt type continuously variable transmission, and a space arranged below the front seat or the rear seat and in which front, rear, right, left, and lower sides thereof are surrounded by surrounding members, wherein the air cleaner, an air intake opening thereof, and an air intake opening at an end of the cooling duct are arranged in the space.

With the above configuration, as compared with the case where the air cleaner for the air intake apparatus for the engine, the air intake opening thereof, and the air intake opening at the end of the cooling duct for cooling the V-belt type continuously variable transmission are arranged in the hood chamber located in front of the riding space, when the air intake openings and the air cleaner are arranged in the space provided below the seat in the riding space, the air intake path from the air intake opening to the air intake portion of the engine arranged below the rear seat and/or the cargo bed and the air intake path from the air intake opening to the air intake portion for cooling the V-belt type continuously variable transmission can be shortened.

With this, the airflow resistance in the air intake paths can be reduced. As a result, the air intake amount can be increased to improve the performance of the engine and the cooling ability of the V-belt type continuously variable transmission. Further, by shortening the air intake paths, the connecting duct from the air cleaner to the intake manifold and the cooling duct of the V-belt type continuously variable transmission can be easily configured. Accordingly, the assembling ability of these ducts can be improved.

In addition, the space is a closed space in which the front, rear, right, left, and lower sides thereof are surrounded by the surrounding members. Therefore, dirt, sand, water, or other foreign substances kicked up by the front wheels or the rear wheels do not enter into the space. By providing the air intake openings in the space, these foreign substances can be prevented from entering into the air cleaner and the cooling duct for cooling the V-belt type continuously variable transmission.

With this, clogging in a filter element of the air cleaner can be reduced. The maintenance and replacing frequency of the filter element can thus be reduced. In addition, any foreign substances can be prevented from entering into the V-belt type continuously variable transmission to improve the durability of the V-belt type continuously variable transmission.

In the air intake apparatus, preferably, the space in which the air cleaner, the air intake opening thereof, and the air intake opening at the end of the cooling duct are arranged is a space below the rear seat.

With the above configuration, the air intake openings and the air cleaner are arranged near the engine and the V-belt type continuously variable transmission. Accordingly, as compared with the case where the air intake openings are arranged below the front seat, the air intake path to the air intake portion of the engine and the air intake path to the air intake portion of the V-belt type continuously variable transmission can be further shortened. In addition, with this, the airflow resistance in the ducts can be further reduced, and the performance of the engine and the cooling ability of the V-belt type continuously variable transmission can be further improved. Further, these ducts can be configured of a single member without being divided. Therefore, the number of components can be reduced, and the assembling ability of these ducts can be further improved.

In the air intake apparatus, preferably, at least a side wall of the surrounding members forming the space near the air cleaner can be detached, and the air cleaner has an air cleaner case divided into two in the vehicle width direction.

With the above configuration, the side wall of the surrounding members forming the space near the air cleaner can be detached. By detaching the side wall, the air cleaner can be easily accessed from the outside of the vehicle in the vehicle width direction. Further, the air cleaner case can be divided in the vehicle width direction. Therefore, by detaching the air cleaner case on the outer side of the vehicle in the vehicle width direction, the maintenance and replacement of the filter element can be easily performed. That is, the maintenance ability of the air cleaner can be improved.

BRIEF DESCRIPTION OF THE DRAWINGS

The above object, features, and advantages of the present invention will be more apparent from the later description associated with the following accompanying drawings.

FIG. 7 is a plan view showing a utility vehicle according to another embodiment; and FIG. 8 is a plan view of a conventional example.

DETAILED DESCRIPTION OF THE INVENTION

Embodiment

FIGS. 1 to 7 show an air intake apparatus according to the present invention, and a utility vehicle having the air intake apparatus. An embodiment of the present invention will be described with reference to these drawings. For convenience of the description, in the following, the front-rear direction of the vehicle is referred to as the front-rear direction of an engine, a V-belt type continuously variable transmission, and other components, and in the vehicle width direction, the right-left direction seen from the driver in the vehicle (the right and left sides when the front side is seen from the rear side of the vehicle) is referred to as the right-left direction of side of a vehicle, an engine, a V-belt type continuously variable transmission, and other components.

[Overall Configuration of Utility Vehicle]

Figure 1:
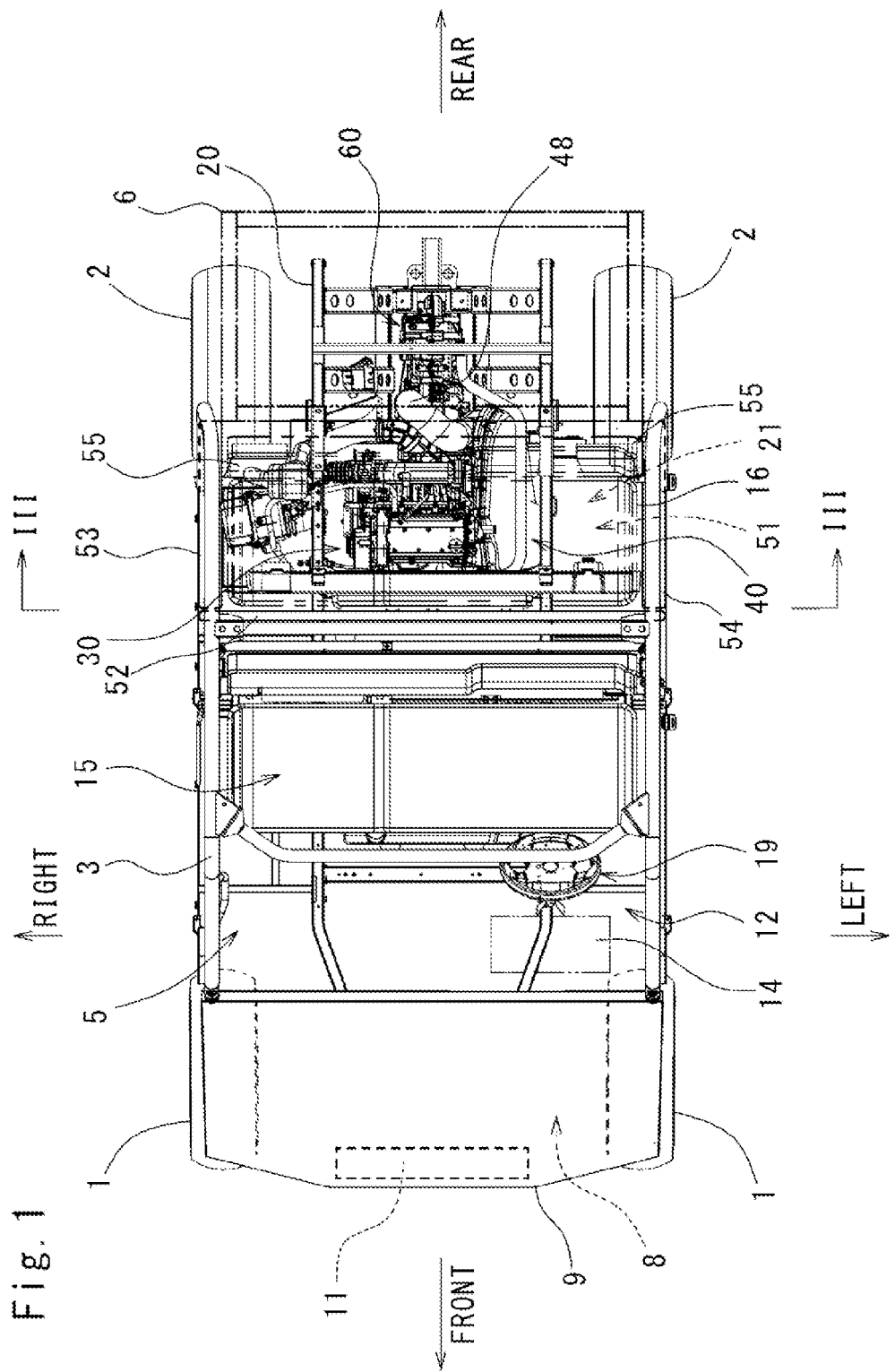
FIG. 1 is a plan view of a utility vehicle having an air intake apparatus according to the present invention in perspective of the rear portion thereof.

FIG. 1 is a plan view of the utility vehicle in perspective of the rear portion thereof. In FIG. 1, the utility vehicle includes a pair of right and left front wheels 1 in the front portion thereof, a pair of right and left rear wheels 2 in the rear portion thereof, a riding space 5 surrounded by a ROPS 3 between the front wheels 1 and the rear wheels 2, and a cargo bed 6 behind the riding space 5. The ROPS 3 is the abbreviation of a rollover protective structure. A hood chamber (space) 8, which is surrounded by the right and left front wheels 1 and a hood 9, is provided in front of the riding space 5. The hood chamber 8 and the riding space 5 are partitioned by a dashboard 12 and a partitioning plate (not shown). A radiator 11 for engine cooling water is disposed at the front end of the hood chamber 8.

A front seat 15 is provided on the front side in the riding space 5. A rear seat 16 is provided on the rear side in the riding space 5. On the rear surface of the dashboard (operating portion) 12 provided on the front side in the riding space 5, an operating panel 14 to which various meters and switches are attached and a steering wheel 19 for steering the vehicle are provided.

Figure 2:
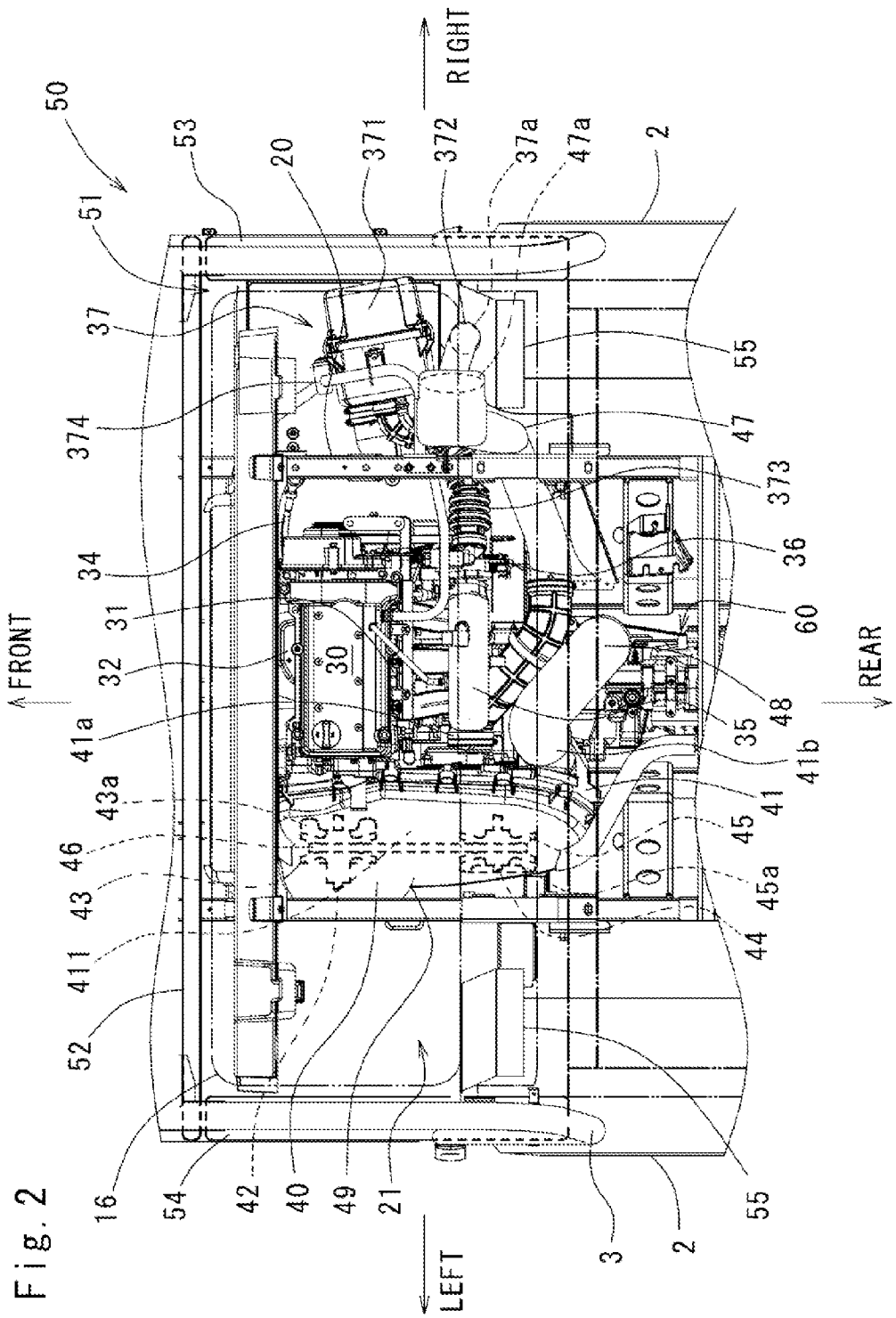
FIG. 2 is an enlarged rear view of FIG. 1.

FIG. 2 is an enlarged rear view of FIG. 1. In FIG. 2, a space (engine room) 21 in which the front, rear, right, left, and lower sides thereof are surrounded by surrounding members 50 is formed below the rear seat 16. The surrounding members 50 includes an under cover 51 covering the lower portion of the vehicle, a front wall 52 extending downward from the front end of the rear seat 16, a right wall 53 extending downward from the right end of the rear seat 16, a left wall 54 extending downward from the left end of the rear seat 16, and a pair of right and left fenders 55 and 55 covering the front sides of the a pair of right and left rear wheels 2. The right wall 53 and the left wall 54 are outer walls of the vehicle, and can be detached.

An engine 30 is a three-cylinder in-line engine. The engine 30 is attached to a body frame 20 via an engine mount rubber (not shown) so that its cylinder line is directed in the vehicle width direction. The engine 30 is located at the substantially center in the vehicle width direction in the space 21. The engine 30 includes an air intake portion 31 communicating with each cylinder in the rear portion thereof, and an exhaust portion 32 communicating with each cylinder in the front portion thereof. In addition, the engine 30 includes, on the right side surface thereof, an oil level gauge 34 for checking the oil amount in an oil pan 33 (see FIG. 3) that is arranged in the lower portion of the engine 30.

A V-belt type continuously variable transmission 40 is attached onto the left side surface of the engine 30, and includes a housing 41, a driving shaft 42 which can be coupled to the crankshaft (not shown) of the engine 30, a driving pulley 43 arranged on the driving shaft 42, a driven shaft 44 which is an input shaft to a shifting mechanism 60, a driven pulley 45 arranged on the driven shaft 44, a V-belt 46 entrained between the driving pulley 43 and the driven pulley 45, and a cover 49. The housing 41 includes an air intake portion 41a opened rightward in the substantially center position in the front-rear direction of the right side surface (behind the engine 30), and an air exhaust portion 41b opened upward in the rear portion thereof.

[Configuration of Air Intake Apparatus for Engine]

The air intake apparatus for engine includes an intake manifold 35 connected at one end to the air intake portion 31 of the engine 30, a throttle body 36 connected to the other end of the intake manifold 35, and an air cleaner 37 connected to the throttle body 36.

Figure 3:
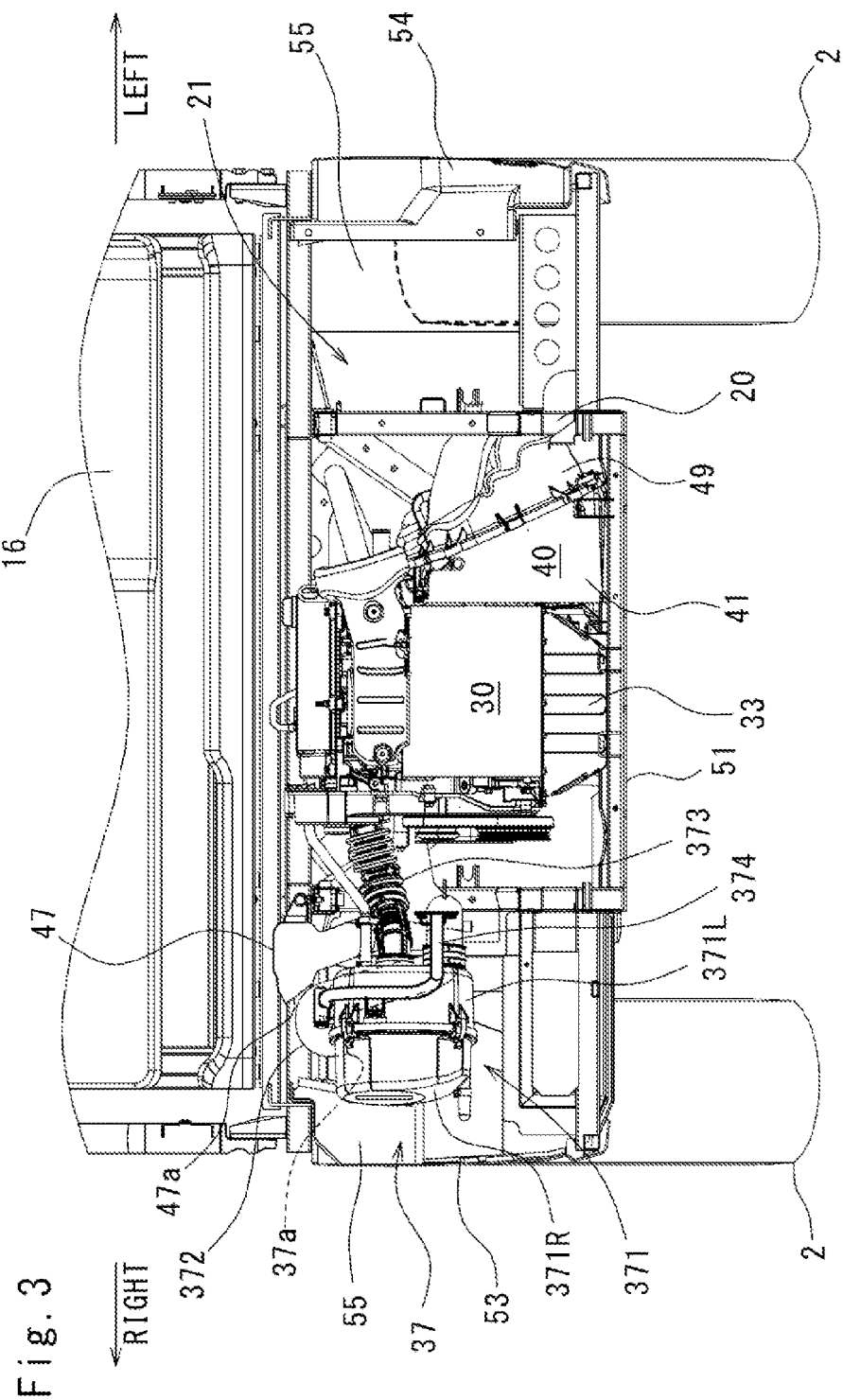
FIG. 3 is a cross-sectional view taken along line III-III of FIG. 1.

The air cleaner 37 includes an air cleaner body 371 accommodating a filter element 375 (see FIG. 4), an upstream air duct (or pipe) 372 connected at one end to the air cleaner body 371 and formed at the other end with an air intake opening 37a, and a downstream air duct (or pipe) 373 connecting the air cleaner body 371 and the throttle body 36. FIG. 3 is a cross-sectional view taken along line III-III of FIG. 1. In FIG. 3, the air cleaner body 371 is arranged on the right side in the space 21 (see FIG. 2), that is, between the engine 30 and the right wall 53.

Figure 4:
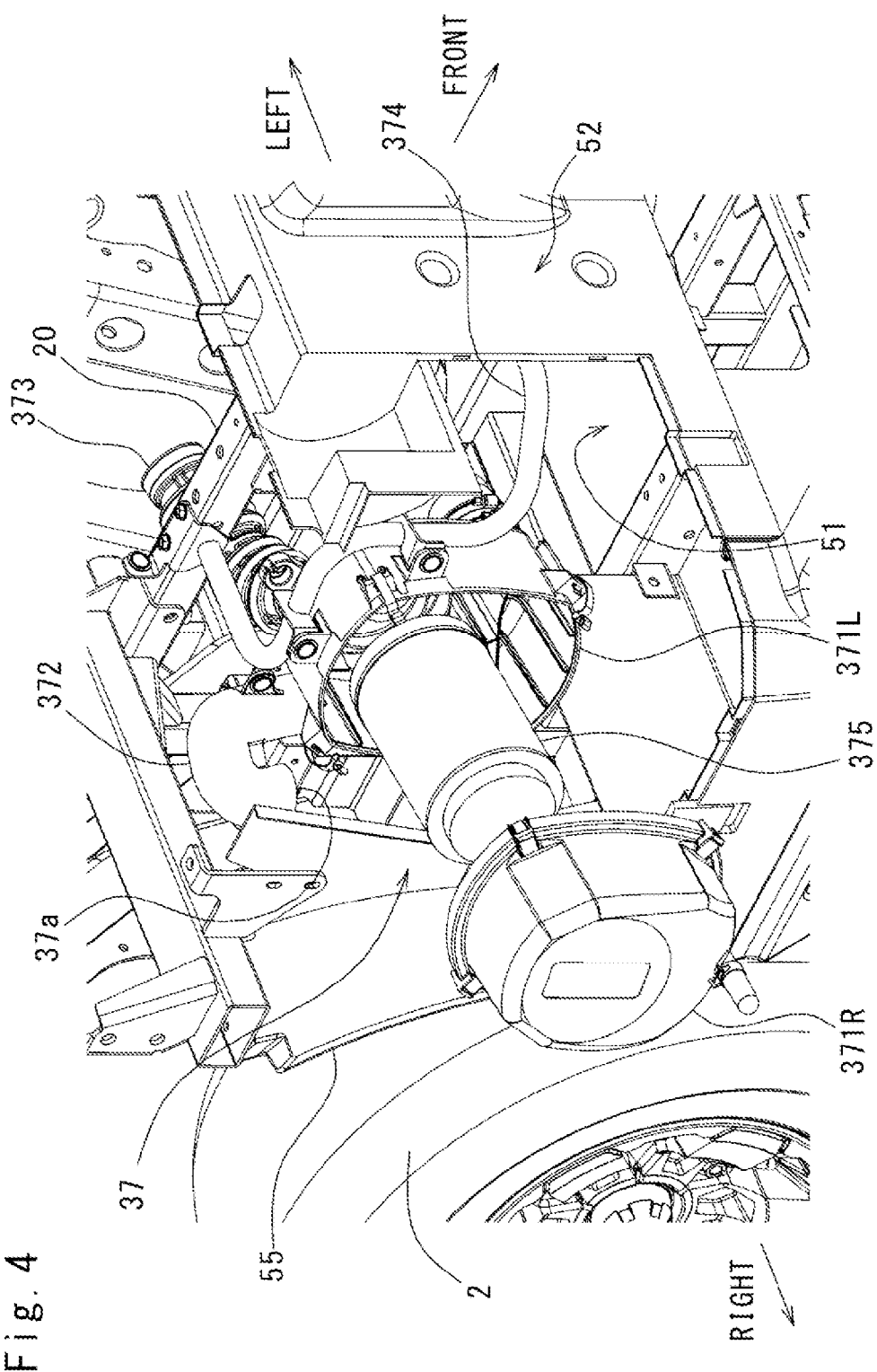
FIG. 4 is a perspective view of an essential part of FIG. 1 showing a state where an air cleaner is disassembled.

FIG. 4 is an exploded perspective view of the air cleaner body 371. In FIG. 4, the air cleaner body 371 is fixed onto the body frame 20 (see FIG. 2) via an attaching bracket 374. In addition, the air cleaner body 371 is divided in the vehicle width direction into a right housing case 371R and a left housing case 371L. The air cleaner body 371 can hold the filter element 375 therein in a state where both the housing cases 371R and 371L are coupled to each other. The right housing case 371R can be detached to the outside of the vehicle. The upstream air duct 372 and the downstream air duct 373 are connected on the left side surface of the left housing case 371L.

As shown in FIGS. 2 and 3, the downstream air duct 373 is connected at one end to substantially the center on the left side surface of the air cleaner body 371, is extended leftward from the air cleaner body 371, and is connected at the other end to the throttle body 36. The downstream air duct 373 is integrally formed with a bellows for absorbing the relative displacement between the engine 30 fixed to the body frame 20 via the engine mount rubber (not shown) and the air cleaner body 371 fixed to the body frame 20 via the attaching bracket 374.

In addition, the upstream air duct 372 is connected at one end to the lower portion of the left side surface of the air cleaner body 371, is extended leftward from the air cleaner body 371, is bent in substantially an L shape so as to extend rearward below the downstream air duct 373, is raised upward behind the downstream air duct 373, and is bent in a substantially U shape below the seat 16. Then, the air intake opening 37a at the end of the upstream air duct 372 is opened downward. The air intake opening 37a is arranged in the space 21 in which the upper side thereof is surrounded by the rear seat 16, the lower side thereof is surrounded by the under cover 51, the front side thereof is surrounded by the front wall 52, the right side thereof is surrounded by the right wall 53, the left side thereof is surrounded by the left wall 54, and the rear side thereof is surrounded by the fenders 55 and 55.

[Configuration of Cooling Device for V-Belt Type Continuously Variable Transmission]

As shown in FIG. 2, the V-belt type continuously variable transmission 40 includes a cooling duct (or pipe) 47 connected to the air intake portion 41a, an exhaust duct (or pipe) 48 connected to the air exhaust portion 41b, a partitioning plate 411 fixed into the housing 41, and a cooling fin 43a provided on the driving pulley 43.

The cooling duct 47 is connected at one end to the air intake portion 41a, is extended rightward below the intake manifold 35 from the right side surface of the V-belt type continuously variable transmission 40, and is raised upward beyond the body frame 20. As shown in FIG. 3, the cooling duct 47 is arranged on the left side of the air intake opening 37a of the air cleaner 37 so that an air intake opening 47a at the other end thereof is opened obliquely downward. That is, as shown in FIG. 2, like the air intake opening 37a of the upstream air duct 372, the air intake opening 47a of the cooling duct 47 is arranged in the space 21 in which the upper side thereof is surrounded by the rear seat 16, the lower side thereof is surrounded by the under cover 51, the front side thereof is surrounded by the front wall 52, the right side thereof is surrounded by the right wall 53, the left side thereof is surrounded by the left wall 54, and the rear side thereof is surrounded by the rear-side fenders 55 and 55.

As shown in FIG. 2, the exhaust duct 48 is connected at one end to the air exhaust portion 41b, is extended upward from the rear portion of the V-belt type continuously variable transmission 40, and is bent in a substantially U shape below the rear seat 16. As shown in FIG. 1, the other end of the exhaust duct 48 is opened downward at substantially the center in the vehicle width direction and outside the space 21, as can be seen in FIG. 2. More particularly, as clearly shown in FIG. 2, an exhaust opening at the other (second) end of the exhaust duct 48 is located to the rear of a width-wise plane in which the rear-side fenders 55 (which form the surrounding members 50 at the rear of space 21) are located.

Figure 5:
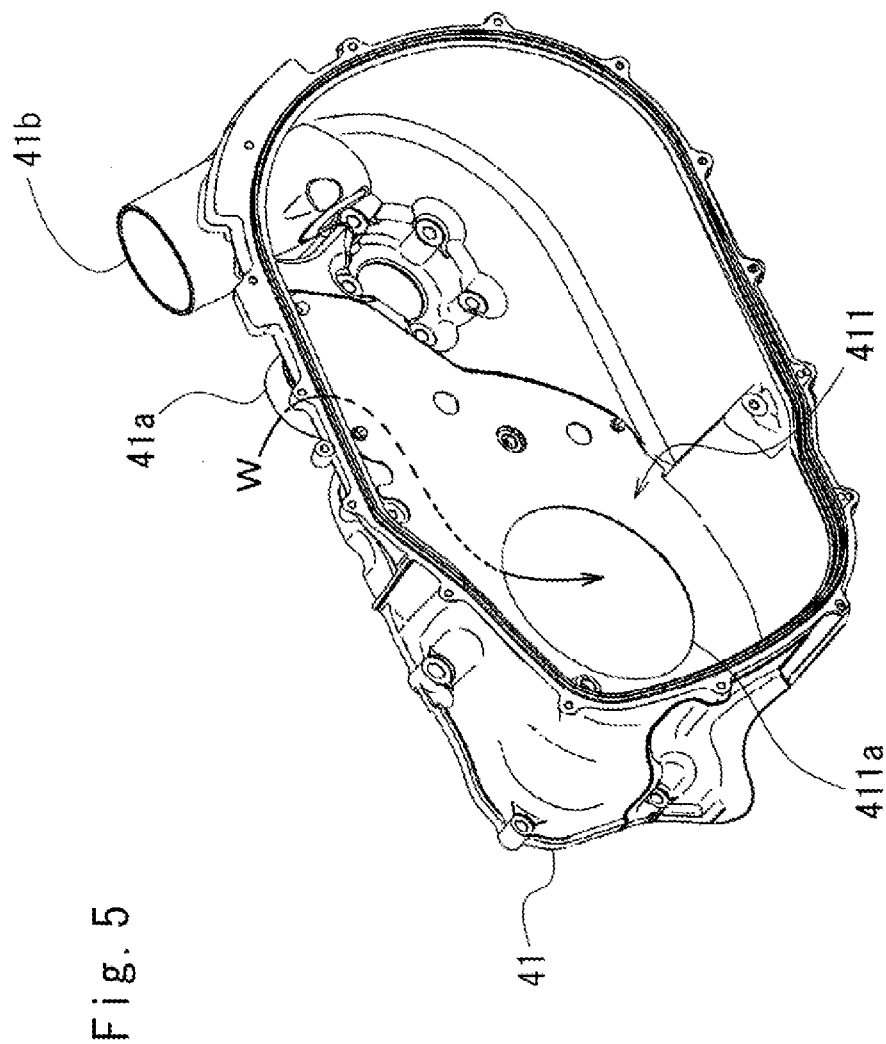
FIG. 5 is a perspective view showing a state where a partitioning plate is attached to a housing of a V-belt type continuously variable transmission.

FIG. 5 is a perspective view of the housing 41. In FIG. 5, the partitioning plate 411 is a plate partitioning the inside of the housing 41 in the right-left direction so as to extend forward from the back side of the air intake portion 41a (that is, left side). The partitioning plate 411 has an opening 411a in the periphery of the driving shaft 42 (see FIG. 2). As indicated by arrow W in FIG. 5, the partitioning plate 411 leads air flowing from the air intake portion 41a via the opening 411a into the left chamber partitioned by the partitioning plate 411.

[Operation]

First, the flow of combustion air supplied into the engine 30 will be described. In FIG. 2, while the vehicle is driven, the air in the space 21 is taken in from the air intake opening 37a of the upstream air duct 372, and then flows into the air cleaner body 371 via the upstream air duct 372. Any foreign substances in the air flowing into the air cleaner body 371 are removed by the filter element 375 (see FIG. 4). The air is then supplied into the throttle body 36 via the downstream air duct 373. The air is delivered from the throttle body 36 into the intake manifold 35. The air is distributed from the intake manifold 35 into the air intake portion 31 of each cylinder to be supplied into each cylinder of the engine 30.

Next, the flow of air for cooling the V-belt type continuously variable transmission 40 will be described. In FIG. 2, while the vehicle is driven, the air in the space 21 is taken in from the air intake opening 47a of the cooling duct 47, and then flows into the air intake portion 41a of the V-belt type continuously variable transmission 40 via the cooling duct 47. In the housing 41 of the V-belt type continuously variable transmission 40, the right space partitioned by the partitioning plate 411 communicates with the periphery of the driving shaft 42. The air which has flowed into the air intake portion 41a is taken in the periphery of the driving shaft 42 while flowing along the right side surface of the partitioning plate 411 by the rotation of the cooling fin 43a provided on the driving pulley 43 arranged on the driving shaft 42.

The air taken in swirls around the driving pulley 43 by the rotation of the cooling fin (centrifugal type) 43a on the driving pulley 43 being rotated, and is then exhausted to the driven pulley 45. Thereafter, the air taken in swirls around the driven pulley 45 by the rotation of the driven pulley 45, and is then exhausted from the exhaust duct 48 to the rear of the engine via the air exhaust portion 41b and exhaust duct 48. In this way, the air is taken in the V-belt type continuously variable transmission 40 and is exhausted, thereby cooling the inside of the V-belt type continuously variable transmission 40. A cooling fin (centrifugal type) 45*a* may be further provided on the driven pulley 45. With this, the inside of the V-belt type continuously variable transmission 40 can be further cooled.

Effects of Embodiment (1) As shown in FIG. 2, the air cleaner 37 of the air intake apparatus for engine, the air intake opening 37*a* thereof, and the air intake opening 47*a* of the air intake apparatus for cooling the V-belt type continuously variable transmission 40 are arranged in the space 21 below the rear seat 16. The air intake path from the air intake opening 37*a* to the air intake portion 31 of the engine 30 and the air intake path from the air intake opening 47*a* to the air intake portion 41*a* of the V-belt type continuously variable transmission 40 can be short.

With this, the airflow resistance in the air intake paths is reduced. Therefore, the airflow amount in the air intake paths can be increased to improve the performance of the engine 30 and the cooling ability of the V-belt type continuously variable transmission 40. Further, by shortening the air intake paths, the downstream air duct 373 connecting the air cleaner body 371 and the intake manifold 35 and the cooling duct 47 of the V-belt type continuously variable transmission 40 can be easily configured. For example, the downstream air duct 373 and the cooling duct 47 are configured of a single member, so that the number of components can be reduced and the assembling ability of the downstream air duct 373 and the cooling duct 47 can be improved.

(2) The space 21 is a space in which the front, rear, right, left, and lower sides thereof are surrounded by the surrounding members 50. Therefore, dirt, sand, water, or other foreign substances kicked up by the front wheels 1 (see FIG. 1) and/or the rear wheels 2 do not enter into the space 21. The air intake opening 37*a* of the air intake apparatus for engine and the air intake opening 47*a* of the V-belt type continuously variable transmission 40 are provided in the space 21. Any foreign substances can thus be prevented from entering into the air cleaner 37 and the cooling duct 47 for cooling the V-belt type continuously variable transmission 40.

With this, clogging in the filter element 375 (FIG. 4) of the air cleaner 37 can be reduced, and the maintenance and replacing frequency of the filter element 375 can be reduced. In addition, any foreign substances can be prevented from entering into the V-belt type continuously variable transmission 40 to improve the durability of the V-belt type continuously variable transmission 40.

(3) The right wall 53 of the surrounding members 50 forming the space 21 near the air cleaner 37 can be detached. By detaching the right wall 53, the air cleaner 37 can be easily accessed from the outside of the vehicle in the vehicle width direction. Further, as shown in FIG. 4, the air cleaner 37 can be divided in the vehicle width direction. Therefore, by detaching the right housing case 371R, the maintenance and replacement of the filter element 375 can be easily performed. That is, the maintenance ability of the air cleaner 37 can be improved.

Figure 6:
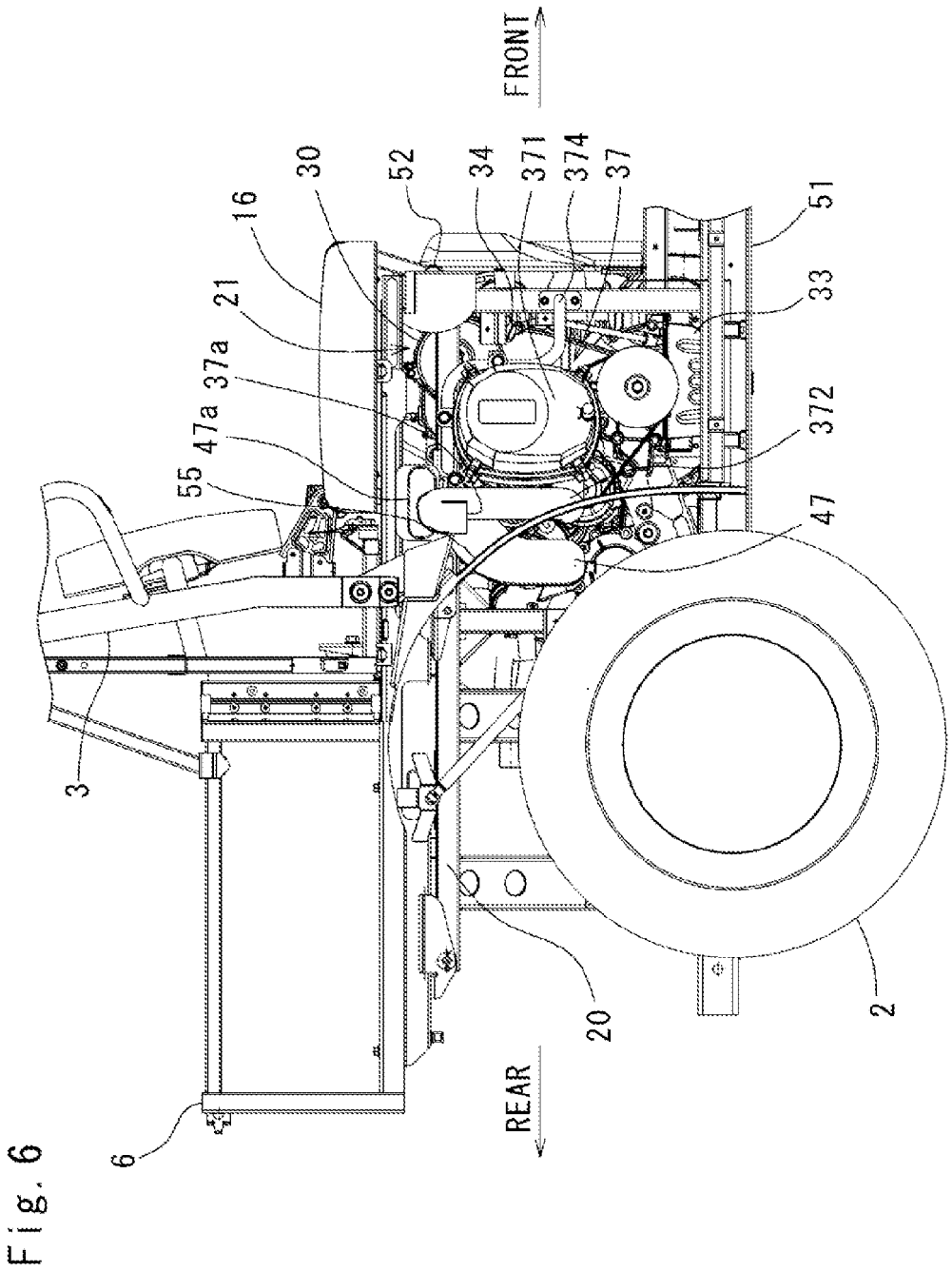
FIG. 6 is an enlarged right side view of FIG. 1 showing the vicinity of the air cleaner.

FIG. 6 is an enlarged view of the right side surface of the utility vehicle from which the right wall 53 of FIG. 1 is detached. As shown in FIG. 6, the oil level gauge 34 can be accessed in a state where the right wall 53 is detached. With this, the oil amount in the oil pan 33 of the engine 30 can be checked. That is, the detachable side wall is provided, and the component which is required to be maintained or regularly checked is arranged around the side wall, thereby improving the maintenance ability of the vehicle.

Other Embodiment

FIG. 7 is a plan view showing a modification example of the arrangement of the air cleaner 37 of the air intake apparatus for engine 30, the air intake opening 37*a* thereof, and the air intake opening 47*a* of the cooling duct 47 of the V-belt type continuously variable transmission 40. The air cleaner 37 and the air intake openings 37*a* and 47*a* are arranged in a space 210 surrounded by surrounding members 500 formed below the front seat 15.

The air intake portion 41*a* for cooling the V-belt type continuously variable transmission 40 is formed in the front portion of the housing 41 to be opened forward. The cooling duct 47 is connected to the air intake portion 41*a*, and is extended to communicate with the space 210 formed below the front seat 15.

In the space 210, the upper side thereof is surrounded by the front seat 15, the lower side thereof is surrounded by an under cover 510, the front side thereof is surrounded by a front wall 520 extending downward from the front end of the front seat 15, the right side thereof is surrounded by a right wall 530 extending downward from the right end of the front seat 15, the left side thereof is surrounded by a left wall 540 extending downward from the left end of the front seat 15, and the rear side thereof is surrounded by a rear wall 550 extending downward from the rear end of the front seat 15. Other configurations and operations are the same as the first embodiment.

With this, the air intake paths can be shortened as compared with the case where the air cleaner 37 of the air intake apparatus for engine 30, the air intake opening 37*a* thereof, and the air intake opening 47*a* of the cooling duct 47 of the V-belt type continuously variable transmission 40 are arranged in the hood chamber 8.

The airflow resistance in the air intake paths can be reduced by shortening the air intake paths. Therefore, like the first embodiment, the performance of the engine 30 and the cooling ability of the V-belt type continuously variable transmission 40 can be improved, and these ducts can be easily configured. In addition, the space 210 is a space surrounded by the surrounding members 500. Therefore, dirt, sand, water, or other foreign substances kicked up by the front wheels 1 and the rear wheels 2 do not enter into the space 210. With this, as described above, any foreign substances can be prevented from entering into the air intake opening 37*a* of the air intake apparatus for engine 30 and the air intake opening 47*a* of the air intake apparatus for the V-belt type continuously variable transmission 40. The maintenance ability of the filter element 375 (see FIG. 4) and the durability of the V-belt type continuously variable transmission 40 can be improved.

In addition, air is taken in from the space below the front seat 15 separated from the space in which the engine 30 and the V-belt type continuously variable transmission 40 are arranged, so that the air which does not contain hot air released from the engine 30 can be taken in. As a result, the performance of the engine 30 and the cooling ability of the V-belt type continuously variable transmission 40 can be improved.

In addition, in the utility vehicle of FIG. 1, the engine 30 is arranged substantially below the rear seat 16, but for example, the present invention is applicable to a utility vehicle in which the engine is arranged below the cargo bed 6 located behind the rear seat 16 and a utility vehicle in which the engine is arranged below the rear seat 16 and the cargo bed 6.

Further, the engine 30 mounted on the utility vehicle of FIG. 1 is a three-cylinder in-line engine, but the present invention is applicable to a utility vehicle on which a single-cylinder engine or a V-type engine is mounted.

The present invention is not limited to the embodiments, and various modification examples can be adopted in the scope without departing from the claims.

What is claimed is:

1. An air intake apparatus for a utility vehicle having a front seat, a rear seat, a cargo bed, an engine arranged below the rear seat and/or the cargo bed, and a V-belt type continuously variable transmission arranged sideward of the engine, the apparatus comprising:
    an air cleaner to be connected to an air intake portion of the engine via an intake manifold;
    a cooling duct to be connected to an air intake portion of the V-belt type continuously variable transmission for cooling the V-belt type continuously variable transmission; and
    a space arranged below the rear seat and in which front, rear, right, left, and lower sides thereof are surrounded by surrounding members;
    wherein the air cleaner, an air intake opening thereof, and an air intake opening at an end of the cooling duct are arranged in the space and located at a side of the engine opposite the V-belt type continuously variable transmission;
    wherein the air intake portion of the V-belt type continuously variable transmission is located at a side wall of the V-belt type continuously variable transmission facing the engine; and
    wherein an entire length of the cooling duct is located in an area extending between a front end of the V-belt type continuously variable transmission and a rear end of the V-belt type continuously variable transmission with respect to a longitudinal axis of the utility vehicle.

2. The air intake apparatus for the utility vehicle according to claim 1, wherein:
    at least a side wall of the surrounding members forming the space near the air cleaner is detachable, and
    the air cleaner has an air cleaner case divided into two portions arranged in a vehicle width direction.

3. The air intake apparatus for the utility vehicle according to claim 1, wherein the surrounding members surrounding the space comprise an under cover, a front wall, a right wall, a left wall, and a rear wall.

4. The air intake apparatus for the utility vehicle according to claim 1, further comprising an exhaust duct having:
    a first end to be connected to an air exhaust portion of the V-belt type continuously variable transmission;
    a second end opposite the first end; and
    an air exhaust opening at the second end, the second end of the exhaust duct being located outside of the space.

5. The air intake apparatus for the utility vehicle according to claim 4, wherein the exhaust opening at the second end of the exhaust duct is located at a rear of a vehicle width-wise plane in which rear-side fenders are located.

6. The air intake apparatus for the utility vehicle according to claim 4, wherein the exhaust opening at the second end of the exhaust duct is located at a rear of a rear side of the space.

7. The air intake apparatus for the utility vehicle according to claim 1, wherein:
    the engine is arranged so that a cylinder line thereof extends in a vehicle width direction, and the engine has an exhaust portion at a front thereof and an intake portion at a rear thereof; and
    the cooling duct is arranged so as to extend below the air intake portion of the engine.

8. The air intake apparatus for the utility vehicle according to claim 1, wherein the V-belt type continuously variable transmission includes:
    a housing;
    a drive shaft to be coupled to a crankshaft of the engine;
    a drive pulley arranged on the drive shaft; and
    a partition plate partitioning an inside of the housing in a vehicle width direction, the partition plate extending forward from a back side of the air intake portion of the V-belt continuously variable transmission, and has an opening around the drive shaft.

* * * * *